United States Patent [19]

Ohsawa

[11] 4,349,860
[45] Sep. 14, 1982

[54] TANTALUM CONDENSER

[75] Inventor: Mitsuo Ohsawa, Tokyo, Japan

[73] Assignee: Sony Corporation, Tokyo, Japan

[21] Appl. No.: 136,424

[22] Filed: Apr. 2, 1980

[30] Foreign Application Priority Data

Apr. 13, 1979 [JP] Japan .................................. 54/45610

[51] Int. Cl.³ .............................................. H01G 1/14
[52] U.S. Cl. .................................. 361/310; 361/306;
361/322; 361/405; 361/433
[58] Field of Search ............... 361/272, 322, 404, 405,
361/433, 310, 306

[56] References Cited

U.S. PATENT DOCUMENTS

| 2,930,951 | 3/1960 | Burger | 36/322 X |
| 3,341,752 | 9/1967 | Fournier | 361/433 |
| 3,344,316 | 9/1967 | Stelmar | 361/405 |
| 3,612,963 | 10/1971 | Piper | 361/309 |
| 3,795,844 | 3/1974 | Markarian | 361/433 |
| 4,085,435 | 4/1978 | Galvagni | 361/433 |

FOREIGN PATENT DOCUMENTS

| 659368 | 3/1963 | Canada | 361/272 |
| 385347 | 12/1964 | Switzerland | 361/322 |

OTHER PUBLICATIONS

"Dictionary of Scientific and Tech. Terms", McGraw-Hill, New York, 1974.

Primary Examiner—Elliot A. Goldberg
Attorney, Agent, or Firm—Hill, Van Santen, Steadman, Chiara & Simpson

[57] ABSTRACT

A tantalum condenser includes a metallic electrode cap; a tantalum material fitted to the metallic electrode cap; a cylindrical metallic electrode facing to the metallic electrode cap; a tantalum lead projected from one end surface of the tantalum material; and a projection formed integrally with one end surface of the metallic electrode, and welded to the tantalum lead, wherein a part of the metallic electrode cap, the tantalum material, a part of the metallic electrode, the tantalum lead and the projection are molded with synthetic resin.

1 Claim, 2 Drawing Figures

TANTALUM CONDENSER

BACKGROUND OF THE INVENTION

1. Field of the Invention

This invention relates to a tantalum condenser, and more particularly to a structure of a tantalum condenser as a leadless circuit part.

2. Description of the Prior Art

A leadless circuit part is known. In the leadless circuit part, metallic terminal caps are attached to both ends of cylindrical (solid or hollow) material. Resistor, condenser, diode and jumper can be manufactured in the form of leadless circuit part. The shapes and sizes of these leadless circuit parts are substantially equal to each other so that they can be mounted on a printed circuit board by the same automatic mounting machine. Different structures were proposed for a tantalum condenser having substantially the same size and shape as other leadless circuit parts. These structures have merits, respectively. However, they are complicated in construction, and it is difficult to manufacture them. Or it is difficult to give them a predetermined capacitance. Further, there are some problems on finishing touches and reliability of the tantalum condenser.

SUMMARY OF THE INVENTION

Accordingly, it is an object of this invention to provide a tantalum condenser which overcomes the above-described defects of the conventional tantalum condenser.

Another object of this invention is to provide a tantalum condenser which is simple in construction.

A further object of this invention is to provide a tantalum condenser which can be easily manufactured.

A still further object of this invention is to provide a tantalum condenser in which the number of parts is small.

A still further object of this invention is to provide a tantalum condenser which is superior in reliability.

In accordance with an aspect of this invention, a tantalum condenser comprises: (A) a metallic terminal cap; (B) a tantalum material fitted to said metallic terminal cap; (C) a metallic terminal facing to said metallic terminal cap; (D) a tantalum lead projected from one end surface of the tantalum material; and (E) a projection formed as one piece with one end surface of this metallic terminal, and welded to the tantalum lead, wherein a part of said metallic terminal cap, the tantalum material, a part of the metallic terminal, the tantalum lead and said projection are molded with synthetic resin.

Various other objects, advantages and features of the present invention will become readily apparent from the ensuing detailed description, and the novel features will be particularly pointed out in the appended claims.

DESCRIPTION OF THE PREFERRED EMBODIMENTS

Next, one preferred embodiment of this invention will be described with reference to the drawings.

Figure 1:
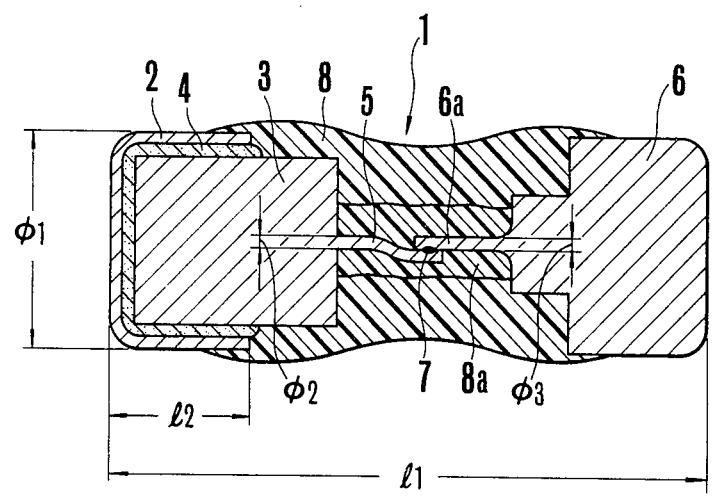
FIG. 1 is a cross-sectional view of a tantalum condenser according to one embodiment of this invention.

In FIG. 1, a reference numeral 1 represents the whole of a tantalum condenser according to one embodiment of this invention. A terminal cap 2 is formed of metal such as iron, and plated with alloy such as 90% tin and 10% solder. Almost half of cylindrical tantalum material 3 is fitted into the terminal cap 2. The tantalum material 3 is fixed to the terminal cap 2 with solder 4. Thus, the former is electrically connected to the latter. A tantalum lead 5 is led out from one end surface of the tantalum material 3. Another terminal 6 is manufactured by cutting copper rod or brass rod, and plated with alloy such as 90% tin and 10% solder. A lead projection 6a is formed as one piece with one end surface of the terminal 6. Top ends of the lead line 6a and tantalum lead 5 are electrically connected by a weld 7.

The tantalum condenser 1 is molded with epoxy resin 8 except one part of the cap 2 and one part of the terminal 6. Before the tantalum condenser 1 is molded with epoxy resin 8, the tantalum lead 5 and the lead 7 are molded with resin 8a having relatively high viscosity coefficient so that the tantalum material 3 and the terminal 6 are stably connected to each other.

Next, there will be described example of dimensions of main portions in the above described tantalum condenser 1.

As outer diameter $\phi 1$ of the terminal cap 2 is 2.2 mm. Thicknesses $\phi 2$ and $\phi 3$ of the tantalum lead 5 and lead projection 6a are equal to each other, and are 0.5 mm. The whole length $l1$ of the tantalum condenser 1 is 6 mm. And a height $l2$ of the terminal cap 2 is 1.5 mm.

Next, there will be described manufacturing steps for the above described tantalum condenser 1.

First, the inner surface of the terminal cap 2 is coated with solder paste, and the tantalum material 3 is fitted into the coated terminal cap 2. The terminal cap 2 with the tantalum material 3 is heated to melt the solder paste. Thus, the terminal cap 2 is fixed to the tantalum material 3. Next, the lead projection 6a of the electrode 6 which was previously formed into the shape shown in FIG. 1, is welded to the tantalum lead 5 of the tantalum material 3 which was previously formed into the shape shown in FIG. 1, at the connecting point 7. The tantalum material 8 and the terminal 6 are molded with resin 8a. Further, they are molded with resin 8. Thus, the tantalum condenser 1 is obtained.

Figure 2:
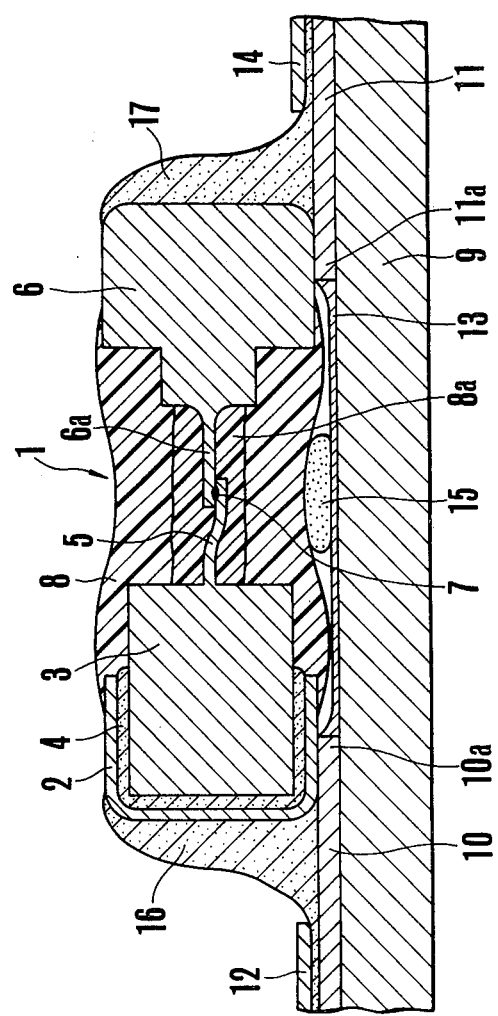
FIG. 2 is a cross-sectional view of the tantalum condenser of FIG. 1 mounted on a printed circuit board.

The tantalum condenser 1 is mounted on a printed circuit board 9 together with other leadless circuit parts, as shown in FIG. 2. Copper foil patterns 10 and 11 are formed on the printed circuit board 9. Solder resists 12, 13 and 14 are formed on the patterns 10 and 11, and the printed circuit board 9. Lands 10a and 11a of the patterns 10 11 as electrode portions are exposed. In the mounting process, adhesive 15 is applied to the solder resist 13 between the lands 10a and 11a by screen-printing method. The tantalum condenser 1 is mounted in contact with adhesive 15 on the printed circuit board 9 so that the terminal cap 2 and the terminal 6 contact with the lands 10a and 11a. Thus, the tantalum condenser 1 is provisionally attached to the printed circuit board 9 by adhesive 15. The printed circuit board 9 with the tantalum condenser 1 is dipped into solder bath, and then drawn up from the solder bath. Thus, the cap 2 and the terminal 6 are electrically and mechanically connected to the lands 10a and 11a through solders 16 and 17.

In this invention, as above described, the terminal 6 is and 6a are formed as one piece the lead 6a. They can be easily formed by machining or forging. The manufacturing steps for the tantalum condenser 1 can be simplified in comparison with those for the conventional tantalum condenser. Since the number of the parts is few, the volume of the tantalum material 3 can be increased. Accordingly, larger capacitance can be obtained. A cap for other leadless circuit parts such as resistor can be used for the tantalum condenser 1. The tantalum condenser 1 is reliable and inexpensive.

While there has been described a preferred embodiment of the invention, obviously further modifications and variations are possible in light of the above teachings. It is therefore to be understood that within the scope of the appended claims, the invention may be practiced otherwise than as specifically described.

I claim as my invention:
1. A tantalum capacitor comprising:
 (A) a first cylindrical metallic terminal cap;
 (B) a tantalum capacitor element electrically and mechanically connected to said metallic terminal cap;
 (C) a second solid cylindrical metallic terminal aligned with said first metallic terminal cap and selected from the group of copper or brass;
 (D) a tantalum lead projecting from one end surface of said tantalum capacitor element toward said second metallic terminal; and
 (E) a projection formed as one piece with one end surface of said second metallic terminal which is welded to said tantalum lead, wherein a part of said first metallic terminal cap, and said tantalum capacitor element, a part of said second metallic terminal, said tantalum lead and said projection are covered with synthetic resin.

* * * * *